United States Patent
Hiramaru (10) Patent No.: US 10,196,107 B2
(45) Date of Patent: Feb. 5, 2019

(54) SWING ARM OF SADDLE RIDING VEHICLE

(71) Applicant: HONDA MOTOR CO., LTD., Tokyo (JP)

(72) Inventor: Masayuki Hiramaru, Kumamoto (JP)

(73) Assignee: HONDA MOTOR CO., LTD., Tokyo (JP)

( * ) Notice: Subject to any disclaimer, the term of this patent is extended or adjusted under 35 U.S.C. 154(b) by 3 days.

(21) Appl. No.: 15/471,249

(22) Filed: Mar. 28, 2017

(65) Prior Publication Data
US 2017/0282999 A1 Oct. 5, 2017

(30) Foreign Application Priority Data
Mar. 31, 2016 (JP) .................................. 2016-072481

(51) Int. Cl.
*B62K 25/28* (2006.01)
*B62M 9/16* (2006.01)

(52) U.S. Cl.
CPC ............. *B62K 25/283* (2013.01); *B62M 9/16* (2013.01)

(58) Field of Classification Search
CPC ............................. B62K 25/283; B62K 25/02
See application file for complete search history.

(56) References Cited

U.S. PATENT DOCUMENTS

| | | | | |
|---|---|---|---|---|
| 6,105,700 A * | 8/2000 | Williams | ................. | B62J 23/00 180/219 |
| 7,520,361 B2 * | 4/2009 | Anzai | ..................... | B62M 9/16 180/227 |
| 7,690,668 B2 * | 4/2010 | Holroyd | ................. | B62K 25/02 280/277 |
| 7,762,369 B2 * | 7/2010 | Riesterer | ................. | F16B 37/14 180/219 |
| 7,815,005 B2 * | 10/2010 | Masuda | ............... | B62K 25/283 180/219 |
| 8,074,760 B2 * | 12/2011 | Aoki | .................... | B62K 25/283 180/227 |
| 8,276,703 B2 * | 10/2012 | Mori | ....................... | B62M 9/16 180/231 |

(Continued)

FOREIGN PATENT DOCUMENTS

JP 57-164879 A 10/1982
JP 2008-162513 A 7/2008

(Continued)

OTHER PUBLICATIONS

Extended European Search Report issued in European Application No. 17163256.5 dated Sep. 14, 2017.

(Continued)

*Primary Examiner* — Joseph M Rocca
*Assistant Examiner* — Michael R Stabley
(74) *Attorney, Agent, or Firm* — Birch, Stewart, Kolasch & Birch, LLP (57) ABSTRACT

A swing arm includes a tubular arm main body and an axle support member configured to support an axle of a rear wheel, wherein a fixing surface for fastening and fixing the axle support member in the arm main body together with the axle is provided at an inner side-surface of the arm main body in a vehicle width direction, and an opening for inserting the axle support member is provided at an outer side-surface of the arm main body in the vehicle width direction.

9 Claims, 8 Drawing Sheets

(56) References Cited

U.S. PATENT DOCUMENTS

| | | | | |
|---|---|---|---|---|
| 8,740,239 B2* | 6/2014 | Lumpkin | ............... | B62K 19/30 |
| | | | | 280/285 |
| 8,827,024 B1* | 9/2014 | Sumi | ...................... | B62K 25/02 |
| | | | | 180/227 |
| 2005/0236206 A1* | 10/2005 | Miyashiro | ............ | B62K 25/283 |
| | | | | 180/227 |
| 2006/0226631 A1* | 10/2006 | Holroyd | ................. | B62K 25/02 |
| | | | | 280/285 |
| 2006/0290097 A1* | 12/2006 | Kawamura | .......... | B62K 25/283 |
| | | | | 280/288 |
| 2008/0156565 A1 | 7/2008 | Aoki | | |
| 2010/0181742 A1 | 7/2010 | Mori | | |

FOREIGN PATENT DOCUMENTS

| | | |
|---|---|---|
| JP | 2008-179254 A | 8/2008 |
| JP | 2009-137375 A | 6/2009 |
| JP | 2010-167866 A | 8/2010 |
| JP | 2011-201503 A | 10/2011 |
| JP | 2012-101694 A | 5/2012 |
| JP | 2012-201340 A | 10/2012 |
| JP | 2013-47036 A | 3/2013 |
| JP | 2014-19230 A | 2/2014 |
| JP | 2014-213818 A | 11/2014 |
| WO | WO 2006/102139 A1 | 9/2006 |

OTHER PUBLICATIONS

Japanese Office Action issued in Japanese Application No. 2016-072481 dated Oct. 3, 2017, together with an English translation.

* cited by examiner

SWING ARM OF SADDLE RIDING VEHICLE

CROSS-REFERENCE TO RELATED APPLICATION

Priority is claimed on Japanese Patent Application No. 2016-072481, filed Mar. 31, 2016, the content of which is incorporated herein by reference.

BACKGROUND

Field of the Invention

The present invention relates to a swing arm of a saddle riding vehicle configured to vertically and swingably support a rear wheel.

Description of Related Art

As a swing arm of a saddle riding vehicle, a configuration in which an arm main body formed by a pipe member having a substantially square cross-sectional shape is disposed along substantially a forward/rearward direction of the vehicle and an axle of a rear wheel is supported by the arm main body in a state the axle of the rear wheel is penetrating the arm main body in the vehicle width direction is known (for example, see Japanese Unexamined Patent Application, First Publication No. 2009-137375).

In the swing arm of the saddle riding vehicle disclosed in Japanese Unexamined Patent Application, First Publication No. 2009-137375, a collar through which the rear wheel is inserted is disposed in the inner side of the tubular arm main body, and an axle penetrating an outer wall of the arm main body in the vehicle direction is fastened and fixed to the outer wall from the outside. In the case of this swing arm, when the axle is fastened from the outside of the outer wall of the arm main body in the vehicle direction, the axle is fixed with respect to the outer wall of the arm main body in the vehicle direction together with the collar.

SUMMARY

However, in the swing arm disclosed in the related art, the collar functioning as an axle supporting member is fastened and fixed with respect to the outer wall of the arm main body in the vehicle width direction together with the axle. Therefore, the fastening load is transferred to the outer wall of the arm main body in the vehicle width direction and also the traveling load input to the axle, collar and the like is easily transferred to the outer wall of the arm main body in the vehicle width direction. Accordingly, the outer wall of the arm main body in the vehicle width direction is required to have a sufficient stiffness that can withstand the input load.

As a result, in the swing arm disclosed in the related art, it is necessary to make the outer wall of the arm main body in the vehicle width direction thick, and therefore, it is likely to be a disadvantage when considering reducing weight of the vehicle and it is likely to receive restriction in design of the arm main body.

An aspect of the present invention is directed to provide a swing arm of a saddle riding vehicle that is possible to suppress a thickening of an outer wall of the arm main body in the vehicle width direction.

An aspect of the present invention employs the following configurations in order to solve the above-mentioned problems.

(1) A swing arm of a saddle riding vehicle according to an aspect of the present invention includes an arm main body formed in a substantially tubular form and substantially extending in a forward/rearward direction of a vehicle body; and an axle support member configured to support an axle of a rear wheel, wherein a fixing surface for fastening and fixing the axle support member in the arm main body together with the axle is provided at an inner side-surface of the arm main body in a vehicle width direction, and an opening for inserting the axle support member is provided at an outer side-surface of the arm main body in the vehicle width direction.

According to the above-mentioned configuration, fastening load of the axle support member and the axle is not applied to the outer wall (side surface) of the arm main body in the vehicle width direction, and is mainly applied to the inner wall (side surface) of the arm main body in the vehicle width direction. In addition, the traveling load input to the axle is mainly transferred to the inner wall (side surface) of the arm main body in the vehicle width direction via the axle support member. For this reason, it is possible to suppress a thickening of the outer wall of the arm main body in the vehicle width direction.

(2) In the swing arm of the saddle riding vehicle of the above-mentioned (1), a cross section of the arm main body taken in a direction substantially perpendicular with an extending direction of the arm main body may have a cross section shape including an arc section, and the fixing surface may have a shape that substantially match with a abutting surface of the axle support member which abuts with the fixing surface.

In this case, a cross section of the arm main body taken in a direction substantially perpendicular with an extending direction of the arm main body has a cross section shape including an arc section. For this reason, compared to a case in which the cross section of the arm main body taken in a direction substantially perpendicular with an extending direction of the arm main body has square cross sectional shape, it is possible to reduce the amount of forming material, and it is possible to obtain weight reduction and reduction in product cost. In addition, the fixing surface of the inner wall (side surface) of the arm main body in the vehicle width direction has a shape that substantially match with a abutting surface of the axle support member which abuts with the fixing surface. For this reason, it is possible to securely receive the load of the axle input to the axle support member by the fixing surface of the inner wall (side surface) of the arm main body in the vehicle width direction.

(3) In the swing arm of the saddle riding vehicle of the above-mentioned (2), the fixing surface of the arm main body and the abutting surface of the axle support member may be formed as a flat surface.

In this case, the fixing surface of the arm main body and the abutting surface of the axle support member are formed as a flat surface. For this reason, it is possible to increase the manufacture accuracy of both members, and it is possible to more stabilize the abut between the both members. Accordingly, it is possible to more securely receive the load of the axle input to the axle support member by the fixing surface.

(4) In the swing arm of the saddle riding vehicle according to any one of the above-mentioned (1) to (3), the inner side-surface of the arm main body, which includes the fixing surface, in the vehicle width direction may be formed by a reinforcement member separate from a base member mainly consisting the arm main body.

In this case, it is possible to easily form the inner wall (side surface) of the arm main body in the vehicle width direction in a desired shape.

(5) in the swing arm of the saddle riding vehicle of the above-mentioned (4), the arm main body may include a substantially tubular member in which a notch portion is provided at a region facing an inner side of the circumferential wall of the arm main body in the vehicle width direction and the reinforcement member jointed to the notch portion in the substantially tubular member.

In this case, the reinforcement member consisting the inner wall (side surface) of the arm main body in the vehicle width direction is connected to the notch portion in the substantially tubular member. For this reason, it is possible to arbitrarily set the shape of the fixing surface without being limited by the cross sectional shape of the substantially tubular member. In addition, since the reinforcement member do not largely protrude to the inner side of the substantially tubular member in the vehicle width direction, it is possible to narrow the occupied space of the arm main body in the vehicle width direction.

(6) In the swing arm of the saddle riding vehicle of the above-mentioned (4) or (5), the reinforcement member may include a cushion connecting section to which an end part of a rear cushion is connected.

In this case, it is possible to efficiently transfer the traveling load, input from the axle to the axle support member, from the reinforcement member, which consist the inner wall (sided surface) of the arm main body in the vehicle width direction, to the rear cushion.

(7) In the swing arm of the saddle riding vehicle according to any one of the above-mentioned (1) to (6), a cover member configured to cover a gap between the opening and the axle support member may be further provided.

In this case, since the gap between the opening and the axle support member cannot be seen from the outside by being covered by the cover member, the appearance can be improved. In addition, in this case, it is possible to suppress contaminations entering the gap between the opening and the axle support member by the cover member.

(8) In the swing arm of the saddle riding vehicle according to the above-mentioned (7), the cover member may be fastened and fixed to the axle in a state in which the axle support member is sandwiched between the cover member and the inner side-surface of the arm main body in the vehicle width direction.

In this case, when the cover member is fastened to the axle, the fastening load is transferred to the inner wall (side surface) of the arm main body in the vehicle width direction via the axle support member. For this reason, the fastening load is suppressed from being applied to the outer wall (side surface) of the arm main body in the vehicle width direction.

(9) In the swing arm of the saddle riding vehicle according to the above-mentioned (7) or (8), a gap may be provided between the cover member and the arm main body.

In this case, since the cover member and the arm main body are made to be in a non-contact manner, it is possible to more securely suppress the fastening load being applied to the outer wall (side surface) of the arm main body in the vehicle width direction.

(10) In the swing arm of the saddle riding vehicle according to any one of the above-mentioned (1) to (9), a screw member disposed along an axis direction of the arm main body may be supported in the arm main body in a rotatable and adjustable state, the axle support member may be disposed so as to be capable of being displaced in the axis direction of the arm main body inside the arm main body, and the axle support member may include a screw receiving section to which the screw member is screwed into.

In this case, since the screw receiving section to which the screw member is screwed into is integrally formed with the axle support member, it is possible to reduce the product cost by reducing the number of the components.

(11) In the swing arm of the saddle riding vehicle according to the above-mentioned (10), the screw member may be supported in the arm main body via an axis direction restricting part in a state a displacement in the axis direction is restricted.

In this case, it is possible to restrict the screw member being displaced in the axis direction by the axis direction restricting part during the rotation operation of the screw member. For this reason, it is possible to easily and accurately adjust the forward/rearward position of the axle support member.

According to the aspect of the present invention, it is possible to suppress a thickening of an outer wall of the arm main body in the vehicle width direction since it is possible to make the traveling load, input to the axle during the vehicle traveling, mainly being supported by the inner wall of the arm main body in the vehicle width direction.

DESCRIPTION OF EMBODIMENTS

Hereinafter, an embodiment of the present invention will be described based on the accompanying drawings. Further, directions of forward, rearward, left, right, and so on, described below are the same as directions of a vehicle described below unless the context clearly indicates otherwise.

In addition, in appropriate places in the drawings used in the following description, an arrow FR showing a forward direction with respect to a vehicle, an arrow LH showing a leftward direction with respect to the vehicle and an arrow UP showing an upward direction with respect to the vehicle are provided.

Figure 1:
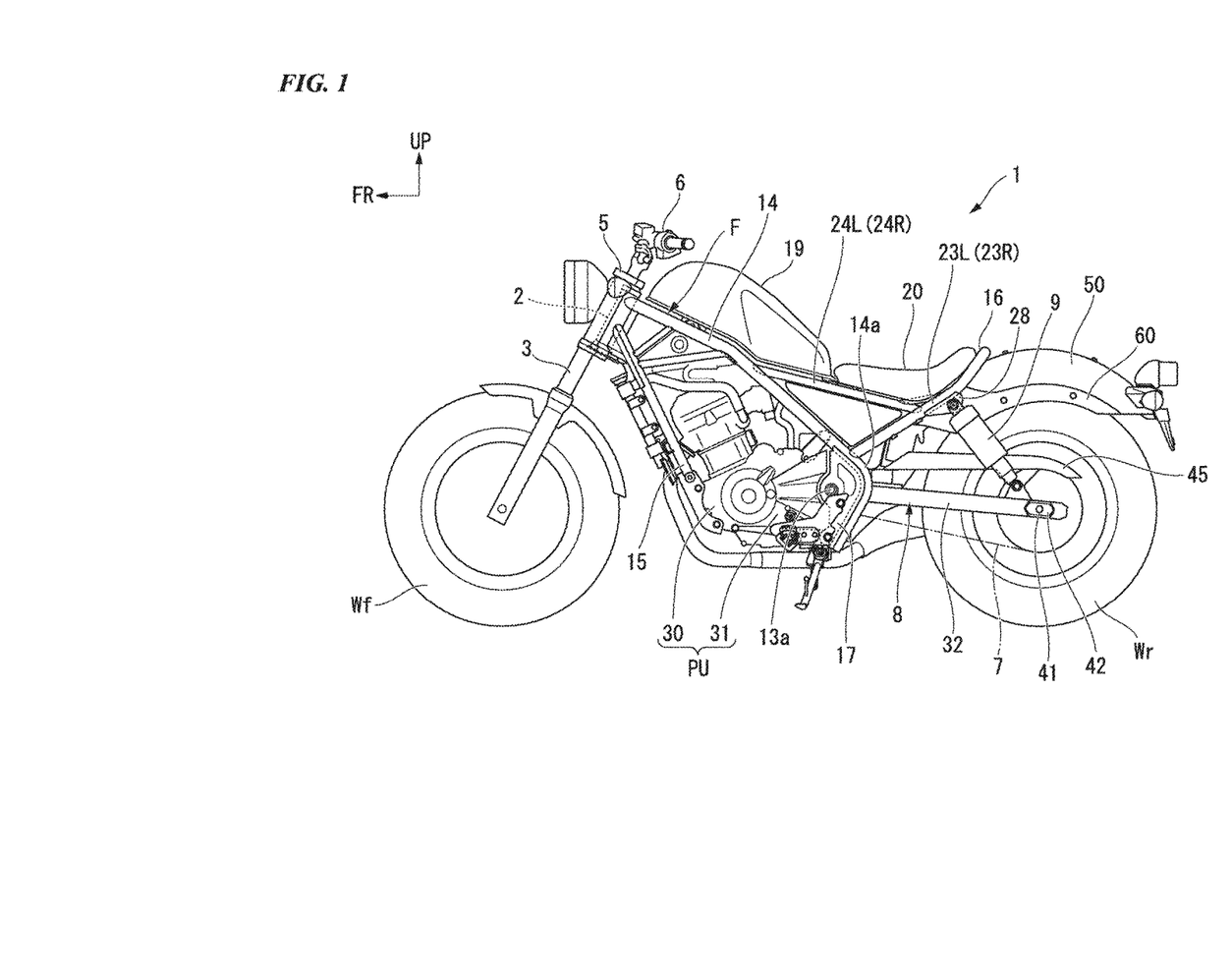
FIG. 1 is a side view of a saddle riding vehicle according to an embodiment of the present invention.

FIG. 1 is a view showing a left side surface of a saddle riding vehicle according to the embodiment. The saddle riding vehicle according to the embodiment is a so-called cruiser type motorcycle 1 in which a vehicle height is decreased and a forward/rearward length is increased. A front wheel Wf of the motorcycle 1 is rotatably supported by lower end portions of a pair of left and right front forks 3. The left and right front forks 3 are supported by a head pipe 2 of a front end portion of a vehicle body frame F via upper and lower bridge members 5 and a steering stem (not shown). A bar type steering handle 6 is attached to the upper bridge member 5.

A rear wheel Wr of the motorcycle 1 is supported by rear end portions of a swing arm 8. A front end portion of the swing arm 8 is vertically and swingably supported by a pivot section 13*a* of the vehicle body frame F. The rear wheel Wr is linked to a power unit PU of the motorcycle 1 via, for example, a transmission mechanism or the like constituted by a chain 7. Lower end portions of rear cushions 9 serving as a suspension part of the rear wheel Wr side are connected to the swing arm 8 in the vicinity of rear wheel support sections.

Figure 2:
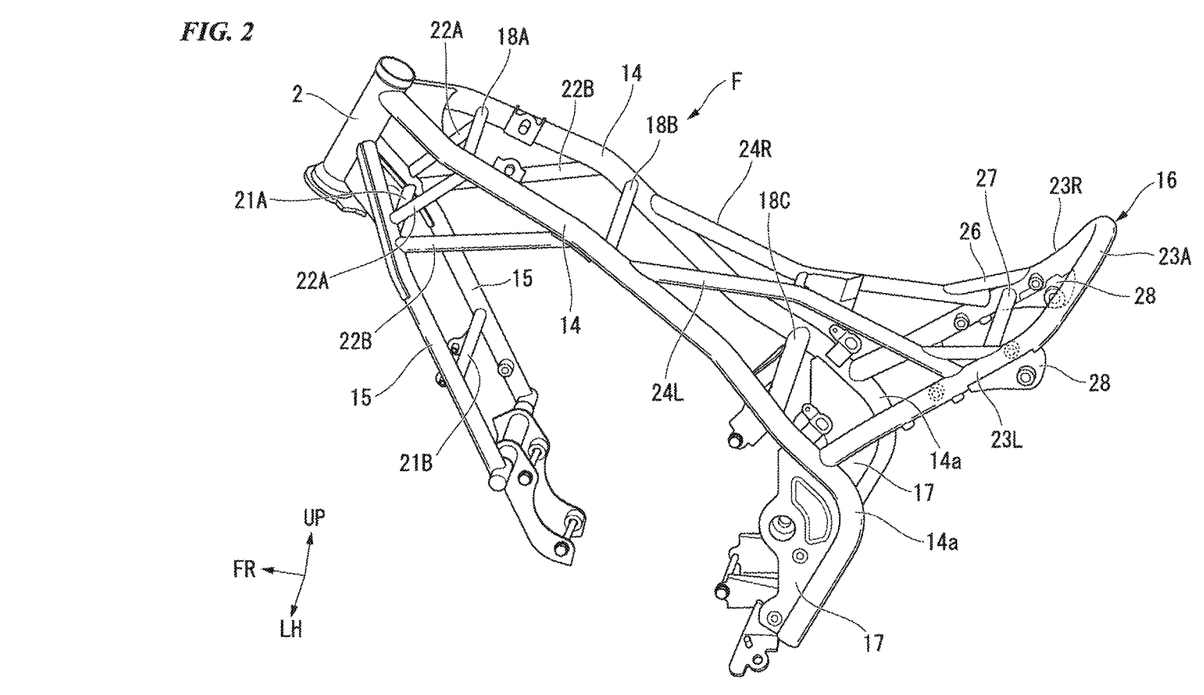
FIG. 2 is a perspective view showing a vehicle body frame of the saddle riding vehicle according to the embodiment of the present invention.

FIG. 2 is a view showing a major part of the vehicle body frame F of the motorcycle 1.

As also shown in FIG. 2, the vehicle body frame F includes the head pipe 2 disposed at a front end portion and configured to support a steering stem (not shown), a pair of left and right main frames 14 branched off from an upper rear side of the head pipe 2 toward left and right sides, extending rearward and downward when seen in a side view and then extending downward by changing a direction at rear curved sections 14*a*, a pair of left and right down frames 15 branched off from a lower rear side of the head pipe 2 toward left and right sides and extending rearward and downward to be steeply inclined more than the main frames 14 when seen in a side view, a rear frame 16 connected to rear upper surface sides of the left and right main frames 14, and a rear fender frame 60 (see FIG. 1) having a front region connected to the rear frame 16 and configured to support a rear fender 50 that covers an upper part of the rear wheel Wr. Further, in FIG. 2, the rear fender frame 60 is not shown.

The left and right main frames 14, in a plan view, are curved toward the outside in the vehicle width direction from joining sections at front end portions joining with the head pipe 2 such that once a separation width therebetween becomes a constant width, the separation width therebetween is narrowed toward the vicinity of the rear curved sections 14*a*, and then, the separation width is widened again downward from the vicinity of the rear curved sections 14*a*. The left and right main frames 14 are connected by a plurality of cross pipes 18A, 18B and 18C. A front region of a fuel tank 19 is disposed over a region, in which the separation width is large, of front section sides of the left and right main frames 14, and a rear region of the fuel tank 19 and an occupant-sitting seat 20 are disposed over a region, in which the separation width is small, of rear section sides of the left and right main frames 14 via the rear frame 16.

In addition, pivot blocks 17 are attached to the rear curved sections 14*a* of the left and right main frames 14 and lower regions thereof. The pivot sections 13*a* configured to support the front end portions of the swing arm 8 are attached to the pivot blocks 17.

The left and right down frames 15 are connected to each other by a plurality of cross pipes 21A and 21B, and upper side regions are connected to front regions of the left and right main frames 14 by gusset frames 22A and 22B.

The power unit PU in which an engine 30 and a gear box 31 are integrated is disposed in a region surrounded by the down frames 15 and the main frames 14. The power unit PU is attached to the down frames 15 and the main frames 14 to constitute a portion of the vehicle body frame F.

The rear frame 16 has a pair of left and right seat frame sections 23L and 23R extending from upper surfaces close to the rear curved sections 14*a* of the left and right main frames 14 toward rear upper sides (extending toward a rear position of the seat 20), and a connecting section 23A that is curved in substantially a U shape and that is configured to connect rear sections of the left and right seat frame sections 23L and 23R.

The rear frame 16 has a pair of left and right seat sub-frame sections 24L and 24R that is further extending from substantially intermediate positions in an extension direction of the left and right seat frame sections 23L and 23R toward front upper sides and that is having front end portions connected to the left and right main frames 14. In addition, cushion brackets 28 to which upper end portions of the rear cushions 9 are connected are fixed to the left and right seat frame sections 23L and 23R in the vicinity of the seat sub-frame sections 24L and 24R.

Figure 3:
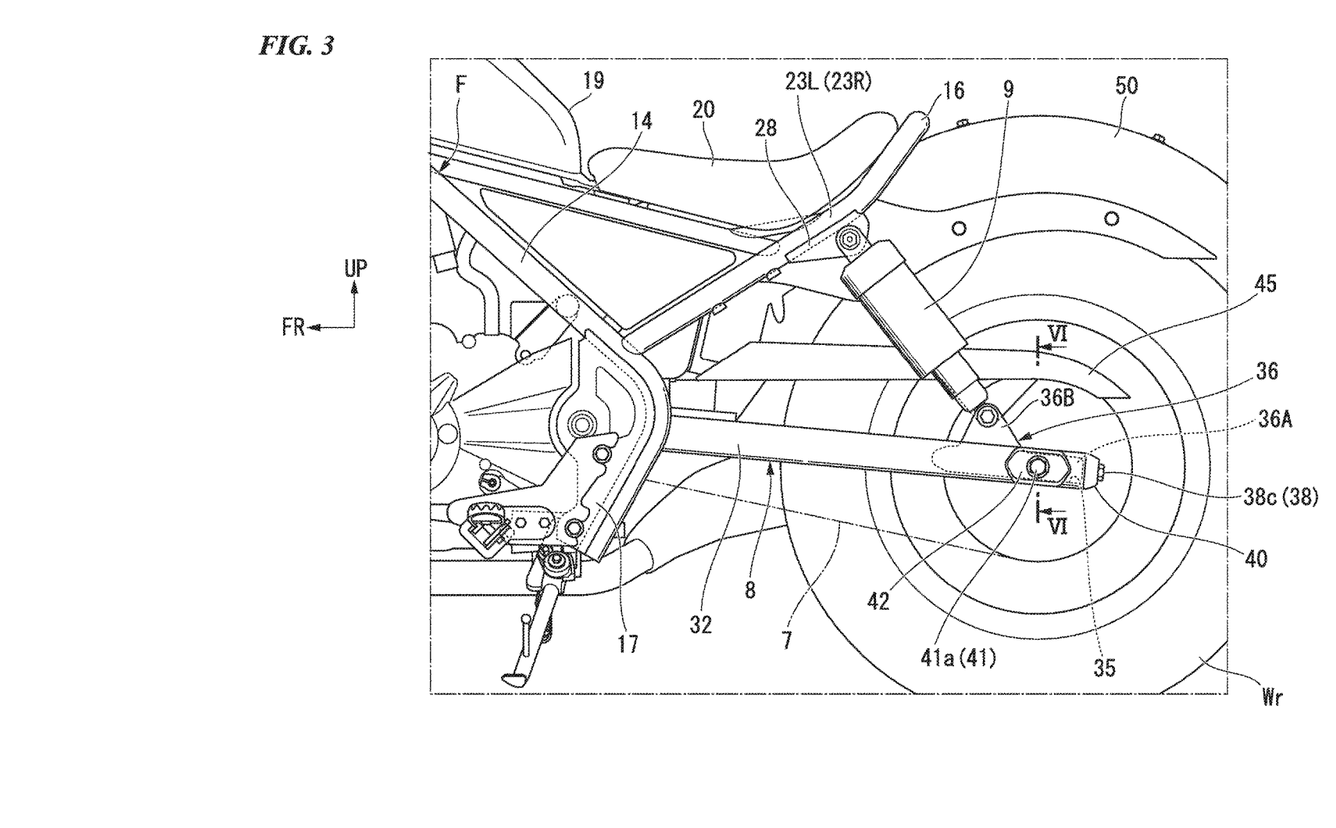
FIG. 3 is a side view showing the saddle riding vehicle according to the embodiment of the present invention, in which a portion of FIG. 1 is enlarged.
Figure 4:
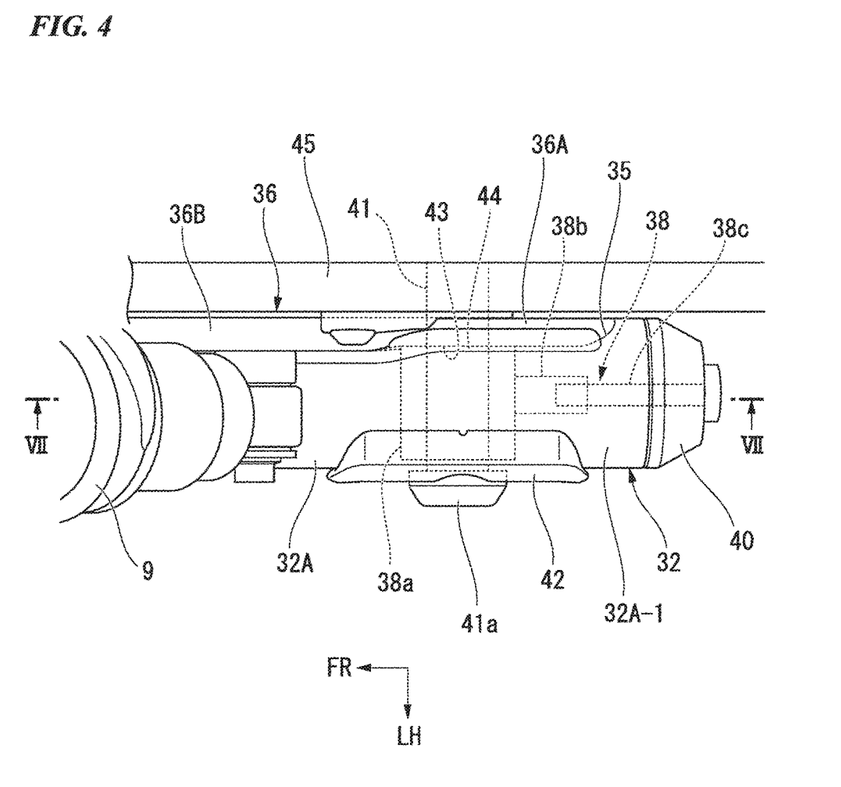
FIG. 4 is a plan view of a swing arm and a rear wheel supporting part according to the embodiment of the present invention.

FIG. 3 is a view showing an enlarged portion of FIG. 1, and FIG. 4 is a view of a portion of the swing arm 8 and a rear wheel supporting part seen from above. In addition, FIG. 5 is a view showing the swing arm 8 when seen from a rear upper side of a left side, and FIG. 6 is a cross-sectional view taken along line VI-VI of FIG. 3.

Figure 5:
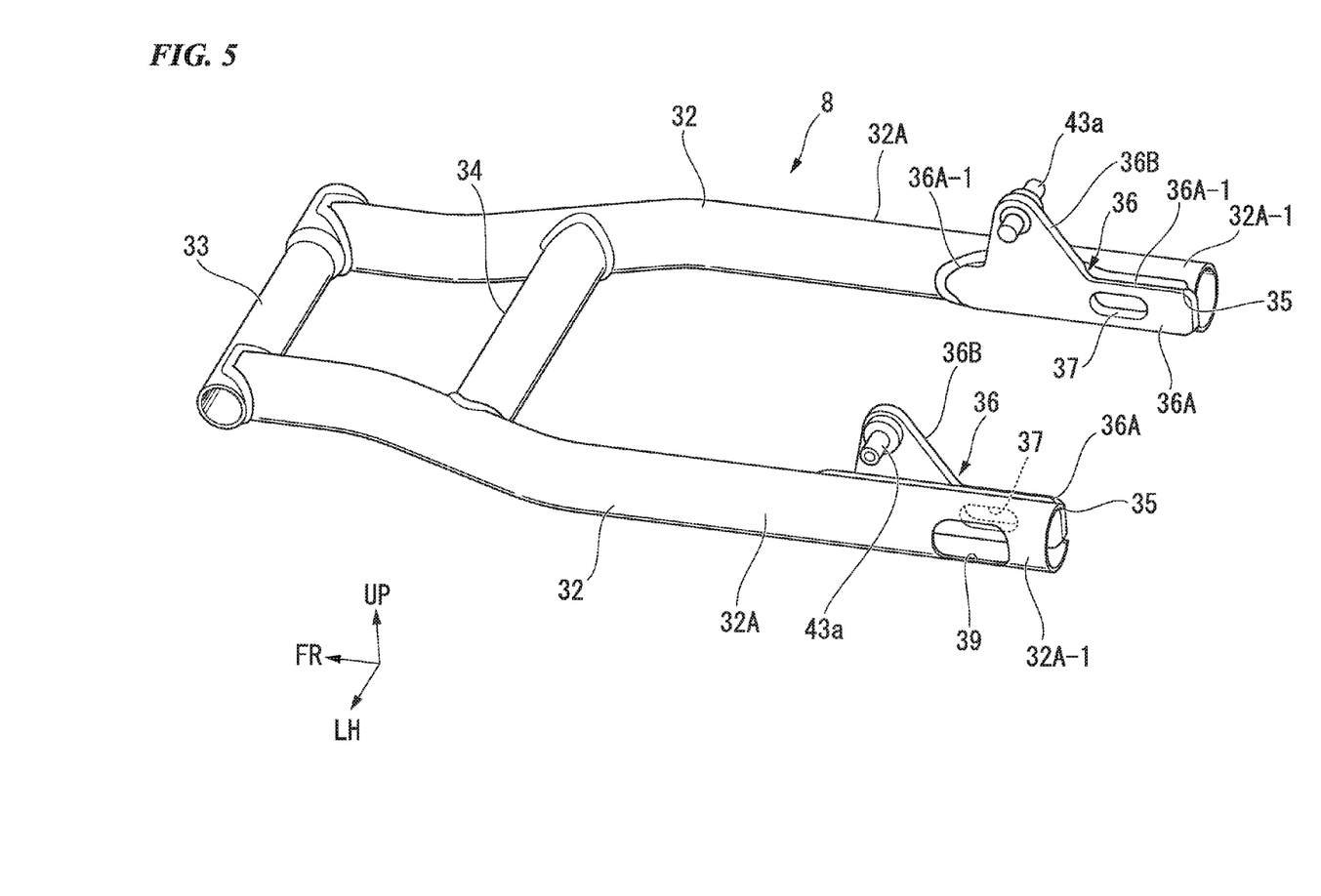
FIG. 5 is a perspective view of a swing arm according to the embodiment of the present invention.
Figure 6:
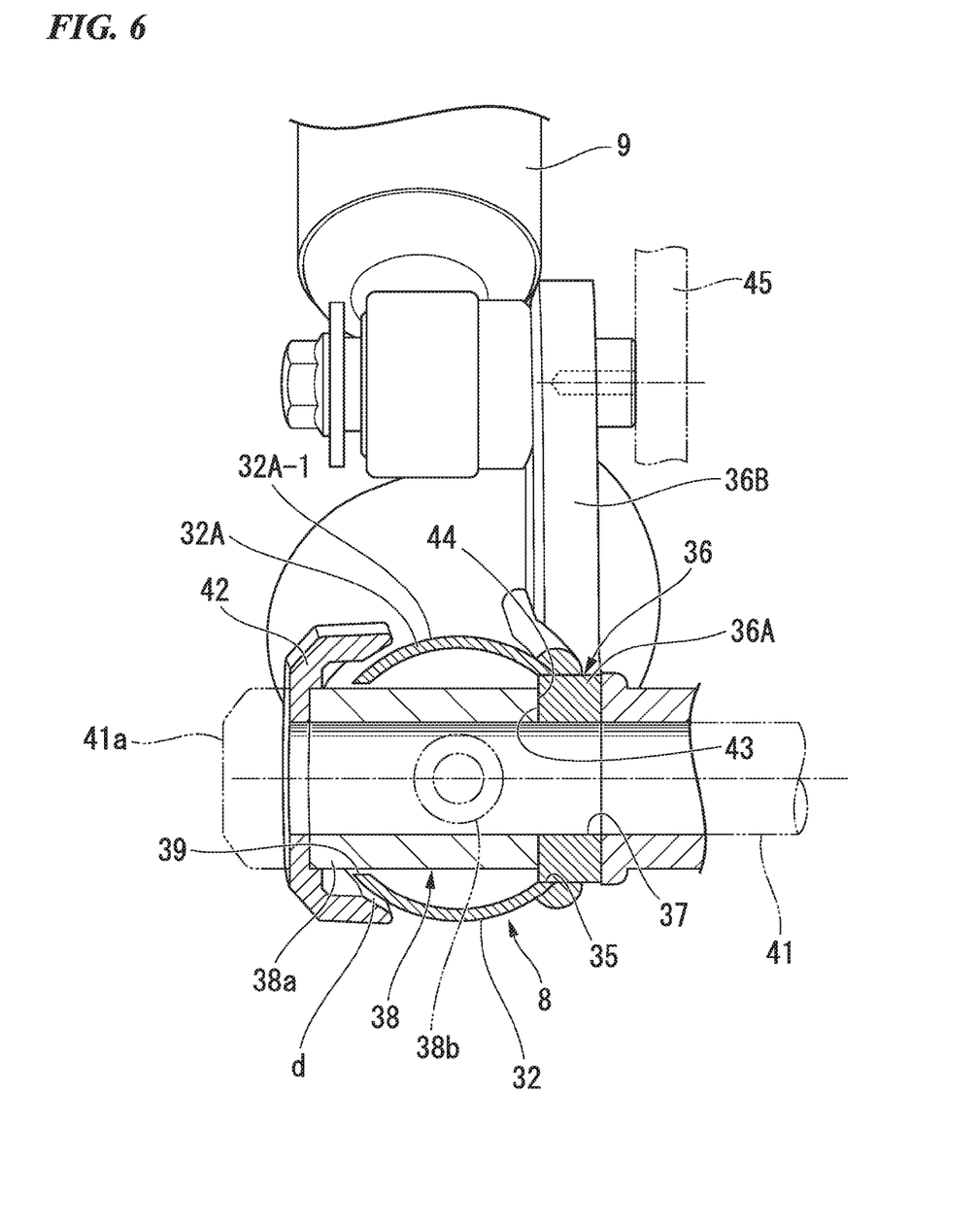
FIG. 6 is a cross-sectional view taken along line VI-VI of FIG. 3 of the saddle riding vehicle according to the embodiment of the present invention.

As shown in FIG. 5, the swing arm 8 has a pair of left and right arm main bodies 32 extending substantially along a forward/rearward direction of the vehicle body, and a first connecting member 33 and a second connecting member 34 configured to connect front section sides of the left and right arm main bodies 32 to each other. The first connecting member 33 configured to connect front end portions of the left and right arm main bodies 32 is vertically and swingably supported with respect to the pivot section 13*a* of the vehicle body frame F.

The left and right arm main bodies 32 are mainly constituted by a tubular metal pipe member 32A (substantially tubular member). In the case of the embodiment, the first connecting member 33 and the second connecting member 34 are also formed of a tubular metal pipe member. The left and right arm main bodies 32 are fixed to the first connecting member 33 and the second connecting member 34 through welding.

The vicinity of rear ends of the left and right arm main bodies 32 are made to be wheel support regions configured to support an axle 41 of the rear wheel Wr. A notch 35 formed by cutting a portion of a circumferential wall of the pipe member 32A is formed at a portion of the wheel support region, which is facing the inside in the vehicle width direction, of each of the arm main bodies 32. The notch 35 is formed in a substantially elongated rectangular shape in an extension direction of the arm main body 32. Further, strictly speaking, the notch 35 has corner sections of a rectangular shape, which are formed in arc shapes. In addition, a width in an upward/downward direction of the notch 35 is set to be smaller than an upward/downward width (a diameter, a height range) of the arm main body 32.

A reinforcement member 36 configured to form an inner wall (side surface) of the wheel support region of the arm main bodies 32 in the vehicle width direction. The reinforcement member 36 is formed by a metal plate member having a wall thickness larger than that of the pipe member 32A, and has an axle support section 36A having substantially the same shape (the substantially rectangular shape) as the notch 35 of the pipe member 32A and a cushion connecting section 36B protruding upward from an upper section near the front section of the axle support section 36A in a substantially triangular shape. The cross section at the wheel support region of each arm main bodies 32 are formed in a cross section form that includes an arc section 32A-1 formed by the pipe member 32A and a flat section formed by the reinforcement member 36.

The axle support section 36A of the reinforcement member 36 is formed in a flat plate form in which the inner surface and the outer surface in the vehicle width direction are flat. The reinforcement member 36 is fixed to the circumferential wall of the pipe member 32A through welding such that the axle support section 36A closes the notch 35 of the pipe member 32A. Accordingly, the axle support section 36A is disposed within the height range of the arm main body 32 when seen in a side view.

The cushion connecting section 36B has an upper section protruding above an upper end portion of the pipe member 32A in a state in which the reinforcement member 36 is fixed to the pipe member 32A through welding. In the case of the embodiment, an outer circumferential portion of the axle support section 36A is a joining section 36A-1 fixed to the circumferential wall of the pipe member 32A through welding. The joining sections 36A-1 extend toward a front side and a rear side of the arm main bodies 32 with the cushion connecting section 36B sandwiched therebetween.

A support hole 37 elongated in an extension direction of the reinforcement member 36 (an extension direction of the arm main body 32) is formed at a portion of the axle support section 36A of the reinforcement member 36 which is behind a continuous installation position of the cushion connecting section 36B. The axle 41 of the rear wheel Wr is fitted into the elongated support hole 37.

In addition, an elongated opening 39 is formed in a region (side surface) at an outer side of the circumferential wall of the arm main body 32 in the vehicle width direction to oppose the support hole 37 of the reinforcement member 36. The opening 39 has an opening width in the upward/downward direction that is set to be larger than an opening width of the support hole 37 in the upward/downward direction. An axle support block 38a (an axle support member) of a chain adjuster 38 (to be described below) and an end portion of the axle 41 protrude outward from the opening 39 in the vehicle width direction. The elongated opening 39 of the arm main body 32 and a circumferential edge portion thereof are covered by a cover member 42 from the outside in the vehicle width direction.

Figure 7:
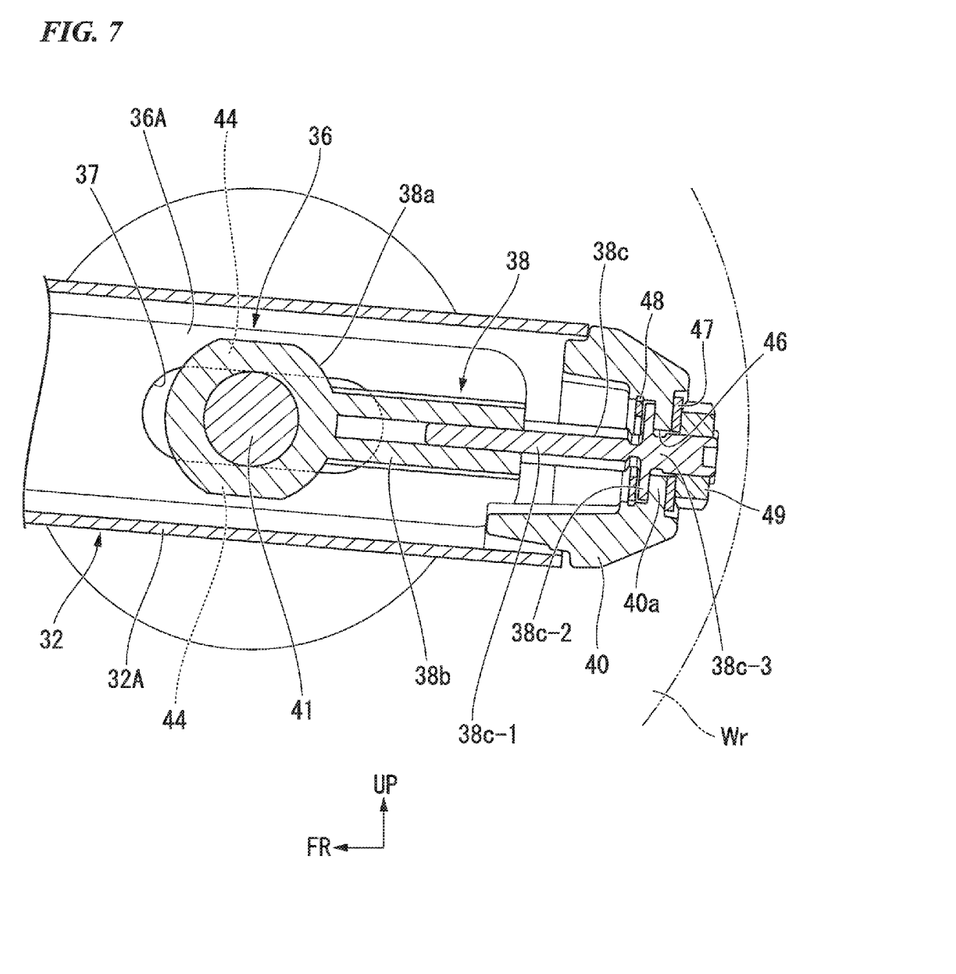
FIG. 7 is a cross-sectional view taken along line VII-VII of FIG. 4 of the swing arm and the rear wheel supporting part according to the embodiment of the present invention.

FIG. 7 is a view showing a cross section taken along line VII-VII of FIG. 4.

As shown in FIGS. 6 and 7, the chain adjuster 38 is formed such that a screw receiving section 38b protrudes from a rear section of the axle support block 38a (axle support member) disposed inside of the arm main body 32 and a tip portion of an adjust screw 38c (screw member) is screwed into the screw receiving section 38b. The adjust screw 38c is rotatably and adjustably supported by a cap 40 attached to the rear end portion of the arm main body 32 by a screwing tool and the like.

As shown in FIG. 7, the adjust screw 38c includes a shaft part 38c-1 having a screw part, and at the one end side of the shaft part 38c-1, a flange part 38c-2 and a support shaft 38c-3 protruding outward than the flange part 38-2 are formed. The support shaft 38c-3 is formed to be coaxial with the shaft part 38c-1, and the support shaft 38c-3 is inserted in an inserting hole 46 formed at an edge wall 40a of the cap 40.

In a state the support shaft 38c-3 is inserted in the inserting hole 46, the flange part 38c-2 abuts the inner part of the edge wall 40a of the cap 40, and the axial displacement of the adjust screw 38 is restricted by a circlip 48 locked to the edge wall 40a in this state. In this embodiment, the flange part 38c-2, edge wall 40a, circlip 48 and the like forms an axis direction restricting part that restricts the axis direction displacement of the adjust screw 38c. In the case of this embodiment, a rearward displacement of the adjust screw 38c is restricted by the flange part 38c-2 abutting the edge wall 40a of cap 40. For this reason, it is possible to restrict the edge part of the adjust screw 38c from protruding rearward in the vehicle body during the rotation operation of the adjust screw 38c.

In addition, a washer 47 and lock nut 49 are attached to the support axle 38c-3 protruding rearward of the edge wall 40a through the inserting hole 46. In the axle support block 38a, a forward/rearward position in the arm main body 32 is appropriately adjusted by rotation of the adjust screw 38c attached to the cap 40.

The axle support block 38a is formed by a substantially tubular metal block, upper and lower sides of which are cut out flatly. The upward/downward width of the axle support block 38a is set to be larger than the upward/downward width of the support hole 37 of the reinforcement member 36 and smaller than the upward/downward width of the opening 39 of the arm main body 32.

As shown in FIG. 6, the axle 41 is inserted into the shaft hole of the axle support block 38a. An end surface on an inner side in the vehicle width direction of the axle support block 38a is formed to abut a surface on an outer side of the axle support section 36A of the reinforcement member 36 in the vehicle width direction (more specifically, an upper edge region and a lower edge region of the support hole 37 in the surface on an outer side of the axle support section 36A in the vehicle width direction).

In the case of the embodiment, the surface on an outer side of the axle support section 36A in the vehicle width direction is a fixing surface 43 to which the axle support block 38a is fixed together with the axle 41. In addition, the end surface on an inner side of the axle support block 38a in the vehicle width direction is an abutting surface 44 that abuts the fixing surface 43. The axle support block 38a is fastened and fixed to the fixing surface 43 of the reinforcement member 36 by fastening of the axle 41 (a bolt) from the outside in the vehicle width direction. The rear wheel Wr is supported by the reinforcement member 36 of the arm main body 32 via the axle support block 38a. Accordingly, the forward/rearward position of the axle 41 of the rear wheel Wr is adjustable by rotation of the adjust screw 38c.

In addition, as shown in FIG. 6, the end portion of the axle support block 38a on an outer side in the vehicle width direction protrudes outward in the vehicle width direction through the openings 39 of the arm main bodies 32. The common axle 41 (bolt shaft) is inserted through the arm main bodies 32 disposed at the left and right of the vehicle body with the rear wheel Wr sandwiched therebetween, and the axle support blocks 38a mounted on the left and right arm main bodies 32 are fastened and fixed to the left and right arm main bodies 32 (the reinforcement members 36) together with the axle 41. In the case of the embodiment, a flange-shaped head section 41a is integrally formed with one end of the axle 41, and a nut (not shown) is screwed onto the other end of the axle. The head section 41a of the axle 41 and the nut are disposed on an outer side of the left and right axle support blocks 38a in the vehicle width direction.

The cover members 42 configured to cover the openings 39 of the left and right arm main bodies 32 and fixed to the axle support blocks 38a are sandwiched between the head sections 41a of the axle 41 or the nuts and the end surfaces of the axle support blocks 38a. In other words, the left and right cover members 42 are fastened and fixed to the axle 41 in a state in which the axle support blocks 38a (axle support members) are sandwiched between walls (the reinforcement members 36) on an inner side of the left and right arm main bodies 32 in the vehicle width direction.

A cover member 42 is fixed to the axle support block 38a by the screwing of axle 41, and as shown in FIG. 6, a gap d is secured between the cover member 42 and the arm main body 32.

Figure 8:
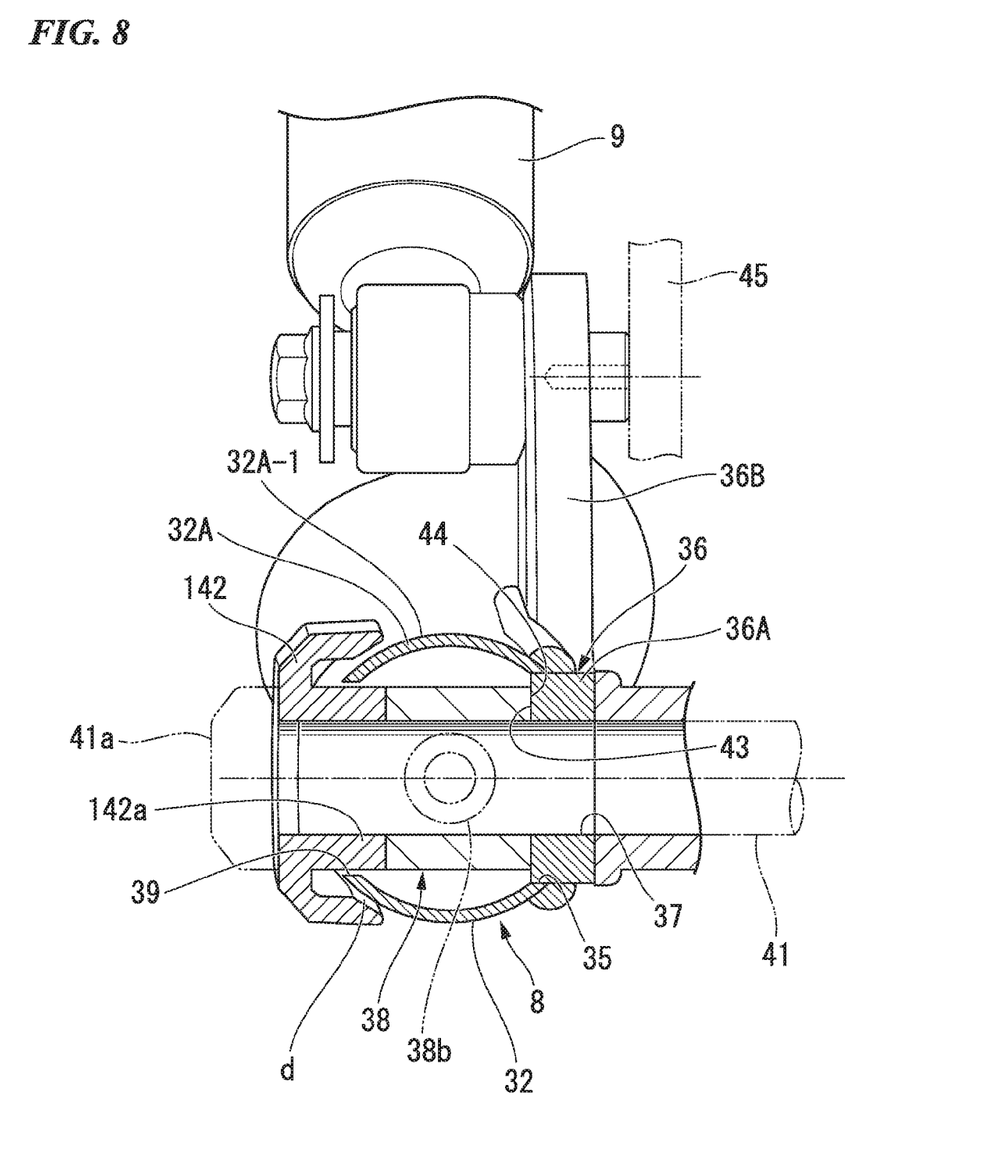
FIG. 8 is a cross-sectional view showing the variant embodiment of the present invention similar to FIG. 6.

In addition, in the embodiment shown in FIG. 6, the outer end portion of the axle support block 38a in the vehicle width direction is protruding outward in the vehicle width direction than the arm main body 32 through the opening 39. However, as shown in the variant embodiment shown in FIG. 8, a cover member 142 including a boss part 142a capable of inserting the opening 39 of the arm main body 32 from the outside in the vehicle width direction may be adopted. Also in this variant embodiment, it is preferable to have the gap d secured between the cover member 142 and the arm main body 32.

In addition, as shown in FIG. 5, outer protrusions 43a protruding outward in the vehicle width direction protrude from the cushion connecting sections 36B of the reinforcement members 36. Lower ends of the rear cushions 9 are fastened to the outer protrusions 43a by bolts. In addition, in the opposite reinforcement member 36 disposed at the left side of the vehicle and across the rear wheel Wr, a chain cover 45 (see FIGS. 3 and 6) configured to cover the outside of the chain 7 for driving is fastened to the cushion connecting section 36B by a bolt.

As described above, in the swing arm 8 of the motorcycle 1 according to the embodiment, a fixing surface 43 for fastening and fixing the axle support block 38a together with the axle 41 is provided at an inner wall of the arm main body 32 (reinforcement member 36) in a vehicle width direction, and an opening 39 for inserting the axle support block 38a is provided at an outer wall of the arm main body 32 in the vehicle width direction. For this reason, fastening load of the axle support block 38a and the axle 41 is not applied to the outer wall of the arm main body 32 in the vehicle width direction, and is mainly applied to the inner wall of the arm main body 32 in the vehicle width direction. In addition, the traveling load input to the axle 41 is mainly transferred to the inner wall of the arm main body 32 in the vehicle width direction via the axle support block 38a.

Accordingly, in the case the swing arm 8 of the embodiment is employed, it is possible to suppress a thickening of the outer wall of the arm main body 32 in the vehicle width direction, and as a result, it is made possible to reduce weight of the swing arm 8, which results as a weight reduction of overall vehicle weight, and to improve freedom for designing the arm main body 32.

In addition, in the swing arm 8 according to the embodiment, a cross section of the arm main body 32 taken in a direction substantially perpendicular with an extending direction of the arm main body 32 is made to have a cross section shape including an arc section 32A-1. For this reason, compared to a case in which the cross section of the arm main body 32 taken in a direction substantially perpendicular with an extending direction of the arm main body 32 is made to have square cross sectional shape, it is possible to reduce the amount of forming material, and it is possible to obtain weight reduction and reduction in product cost.

In addition, in the case of the swing arm 8 according to the embodiment, fixing surface 43 of the inner wall of the arm main body 32 in the vehicle width direction has a shape that match with a abutting surface 44 of the axle support block 38a.

For this reason, it is possible to securely receive the traveling load, input from the axle 41 to the axle support block 38a, by the fixing surface 43 of the inner wall of the arm main body 32 in the vehicle width direction.

Especially, in the swing arm 8 according, to the embodiment, the fixing surface 43 of the arm main body 32 and the abutting surface 44 of the axle support block 38a are formed as a flat surface. For this reason, it is possible to increase the manufacture accuracy of the fixing surface 43 and the abutting surface 44, and it is possible to more stabilize the abut between the fixing surface 43 and the abutting surface 44. Accordingly, when this swing arm 8 is employed, it is possible to more securely receive the traveling load, input from the axle 41 to the axle support block 38a, by the fixing surface 43 of the inner wall of the arm main body 32 in the vehicle width direction.

In addition, in the swing arm 8 according to the embodiment, the inner wall of the arm main body 32, which includes the fixing surface 43, in the vehicle width direction is formed by a reinforcement member 36 separate from a pipe member 32A (base member) of the arm main body 32. For this reason, it is possible to easily form the inner wall of the arm main body 32 in the vehicle width direction in a desired shape.

In addition, in the swing arm 8 according to the embodiment, a notch portion 35 is provided at the pipe member 32A (substantially tubular member) of the arm main body 32, and the reinforcement member 36 consisting the inner wall of the arm main body 32 in the vehicle width direction is connected to the notch portion 35. For this reason, it is possible to arbitrarily set the shape of the fixing surface 43 without being limited by the basic cross sectional shape of the pipe member 32A. In addition, in a case this embodiment is employed, since the reinforcement member 36 do not largely protrude to the inner side of the pipe member 32A in the vehicle width direction, it is possible to narrow the occupied space by the arm main body 32 in the vehicle width direction.

In addition, in the swing arm 8 according to the embodiment, a cushion connecting section 36B for connecting the rear cushion 9 is integrally formed with the reinforcement member 36 consisting the inner wall of the arm main body 32 in the vehicle width direction. For this reason, it is possible to efficiently transfer the traveling load, input from the axle 41 to the inner wall of the arm main body 32 in the vehicle width direction via the axle support block 38a, through the cushion connecting section 36B of the reinforcement member 36 to the rear cushion 9. Accordingly, it is possible to sufficiently absorb the traveling vibration transferred from the rear wheel Wr to the vehicle body by the rear cushion 9.

In addition, in the swing arm 8 according to the embodiment, a cover member 42 configured to cover a gap between the opening 39 of the outer wall of the arm main body 32 in the vehicle width direction and the axle support block 38a. For this reason, the gap between the opening 39 and the axle support block 38a cannot be seen from the outside. Accordingly, in a case this configuration is employed, the appearance of the vehicle can be improved. In addition, in a case this configuration is employed, it is possible to suppress contaminations such as mud and dusts entering the gap between the opening 39 and the axle support block 38a by the cover member 42 during the vehicle traveling and the like.

In addition, in the swing arm 8 according to the embodiment, the cover member 42 is fastened and fixed to the axle 41 in a state in which the axle support block 38a is sandwiched between the cover member 42 and the inner wall of the arm main body 32 (reinforcement member 36) in the vehicle width direction. For this reason, the fastening load directly input to the cover member 42 can be securely transferred to the inner wall of the arm main body 32 in the vehicle width direction via the axle support block 38a. Accordingly, it is possible to suppress the fastening load input to the cover member 42 from being applied to the outer wall of the arm main body 32 in the vehicle width direction.

Especially, in the swing arm 8 according to the embodiment, a gap d is provided between the cover member 42 and the arm main body 32, and it is made to a configuration in which the cover member 42 do not contact with the outer wall of the arm main body 32 in the vehicle width direction. For this reason, it is possible to more securely suppress the fastening load being applied to the outer wall of the arm main body 32 in the vehicle width direction.

In addition, in the swing arm 8 according to the embodiment, a adjust screw 38c disposed along an axis direction of the arm main body 32 is supported in the arm main body 32 in a rotatable and adjustable state via cap 40, the axle support block 38a is disposed so as to be capable of being displaced in the axis direction of the arm main body 32 inside the arm main body 32, and a screw receiving section 38b to which the adjust screw 38c is screwed into is integrally formed with the axle support block 38a. For this reason, in the case the swing arm 8 of the embodiment is employed, it is possible to reduce the product cost by reducing the number of the components forming the chain adjuster 38.

In addition, in the swing arm 8 according to the embodiment, the adjust screw 38c of the chain adjuster 38 includes a flange part 38c-2, and the forward/rearward displacement of the flange part 38c-2 is restricted by the circlip 48 and the edge wall 40a of the cap 40. Accordingly, in the case the swing arm 8 of the embodiment is employed, the displacement of the adjust screw 38c in the axis direction, especially; the displacement to the rearward is securely restricted. For this reason, it is possible to suppress the displacement of the adjust screw 38c to the rearward of the cap 40 due to the rotation operation of the adjust screw 38c. Therefore, it is possible to improve the workability when adjusting the forward/rearward position of the axle 41.

Further, the present invention is not limited to the above-mentioned embodiment but various design changes may be made without departing from the scope of the present invention.

In addition, all vehicles on which a driver rides on the vehicle body are included as the saddle riding vehicle, and in addition to the motorcycle (including a motorized bicycle and a scooter type vehicle), a three-wheeled vehicle as a two-front-wheeled and one-rear-wheeled vehicle or the like may also be included.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A swing arm of a saddle riding vehicle comprising:
an arm main body formed in a substantially tubular form and substantially extending in a forward/rearward direction of a vehicle body; and
an axle support member configured to support an axle of a rear wheel,
wherein a fixing surface for fastening and fixing the axle support member in the arm main body together with the axle is provided at an inner side-surface of the arm main body in a vehicle width direction,
wherein an opening for inserting the axle support member is provided at an outer side-surface of the arm main body in the vehicle width direction,
wherein the inner side-surface of the arm main body, which includes the fixing surface, in the vehicle width direction is formed by a reinforcement member separate from a base member mainly consisting the arm main body, and
wherein the arm main body includes a substantially tubular member in which a notch portion is provided at a region facing an inner side of a circumferential wall of the arm main body in the vehicle width direction.

2. The swing arm of the saddle riding vehicle according to claim 1, wherein a cross section of the arm main body taken in a direction substantially perpendicular with an extending direction of the arm main body has a cross sectional shape including an arc section, and
wherein the fixing surface has a shape that substantially matches with a abutting surface of the axle support member which abuts with the fixing surface.

3. The swing arm of the saddle riding vehicle according to claim 2, wherein the fixing surface of the arm main body and the abutting surface of the axle support member are formed as a flat surface.

4. The swing arm of the saddle riding vehicle according to claim 1, wherein the reinforcement member includes a cushion connecting section to which an end part of a rear cushion is connected.

5. The swing arm of the saddle riding vehicle according to claim 1, further comprising:
a cover member configured to cover a gap between the opening and the axle support member.

6. The swing arm of the saddle riding vehicle according to claim 5, wherein the cover member is fastened and fixed to the axle in a state in which the axle support member is sandwiched between the cover member and the inner side-surface of the arm main body in the vehicle width direction.

7. The swing arm of the saddle riding vehicle according to claim 5, wherein a gap is provided between the cover member and the arm main body.

8. The swing arm of the saddle riding vehicle according to claim 1, wherein a screw member disposed along an axis direction of the arm main body is supported in the arm main body in a rotatable and adjustable state,
wherein the axle support member is disposed so as to be capable of being displaced in the axis direction of the arm main body at inside the arm main body, and
wherein the axle support member includes a screw receiving section to which the screw member is screwed into.

9. The swing arm of the saddle riding vehicle according to claim 8, wherein the screw member is supported in the arm main body via an axis direction restricting part in a state a displacement in the axis direction is restricted.

* * * * *